United States Patent Office

3,287,459
Patented Nov. 22, 1966

---

3,287,459
CARBOSTYRILS, COUMARINES AND THIOCOUMARINES
Hans Willi Zimmer, Cincinnati, Ohio, and James M. Holbert, Lookout Mountain, Tenn., assignors to The Chattanooga Medicine Company, Chattanooga, Tenn., a corporation of Tennessee
No Drawing. Filed Oct. 23, 1961, Ser. No. 147,065
4 Claims. (Cl. 260—289)

With respect to the Halogenation portion, it will be noted that this is a continuation-in-part of our copending application Serial No. 748,132, filed July 14, 1958, now abandoned.

The instant invention relates to novel organic compounds and a novel method of preparing the same, and more particularly, to novel butyrolactone derivatives, their preparation, a process of forming rearrangement products thereof, and the rearrangement products per se.

Although the compounds of the invention may have a number of uses in various fields, they are particularly useful as pharmaceutical compounds and/or chemical intermediates in the synthesis of pharmaceutical compounds. The ultimate rearrangement products per se are useful as anticoagulants and precursors to antihistamines. In addition to being useful as intermediates for the preparation of the ultimate rearrangement products, the other compounds of the invention may function as a uterine depressant and antispasmodic for smooth muscle. Also, the compounds of the invention may display antibacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new drug. It is believed that the exposure of such bacteria to known sulfa drugs often tends to result in the survival of a strain resistant to such drugs, but still sensitive to a new drug to which the strain has not yet been exposed. There is thus a great need for new compounds which display antibacterial activity.

It will be noted that the instant specification is divided into three principal parts, namely, Halogenation, Dehydrohalogenation, and Rearrangement. The Halogenation portion of this disclosure is directed to the method of halogenating certain butyrolactone derivatives and the product so obtained. Both the Halogenation method and product are new. With respect to the Dehydrohalogenation portion of the specification, it will be noted that there is described a process for the dehydrohalogenation of certain of the novel halogenated products herein described, and this process as well as the product resulting therefrom is also new.

With respect to the Rearrangement portion of the specification, it will be noted that a novel rearrangement reaction is described for the purpose of obtaining new chemical compounds. This rearrangement process involves the use in part of products of the dehydrohalogenation process as starting materials, and the use of certain other compounds which are new and which are described and claimed in other copending applications which are specifically designated hereinafter.

It is therefore an important object of the instant invention to provide new and useful butyrolactone derivatives and rearrangement compounds thereof.

It is another object of the instant invention to provide novel methods of producing such butyrolactone derivatives and rearrangement products thereof.

Other and further objects, features and advantages of the present invention will become apparent to those skilled in the art from the following detailed disclosure thereof.

In general, certain of the compounds of the instant invention are alpha substituted gamma-butyrolactones. The gamma-butyrolactone ring has the following formulae:

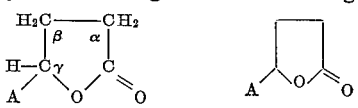

wherein A is H or $CH_3$. Strictly speaking the compound is gamma-valerolactone when A is $CH_3$, but this compound is also gamma-(methyl)-gamma-butyrolactone. The butyrolactone derivatives of the instant invention are substituted at the alpha position on the butyrolactone ring.

Certain alpha substituted butyrolactones, and their methods of preparation, are known. For example, Losanitsch (Monatsh. 35, 311, 1914) discloses alpha-(benzal)-gamma-valerolactone:

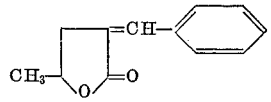

German Patent No. 844,292 of 1944 discloses alpha-(benzal)-gamma-butyrolactone:

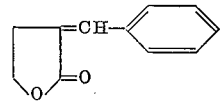

which is now a commercially available compound. The German patent discloses the condensation of butyrolactone with banzaldehyde to produce the above compound.

HALOGENATION

Certain compounds of the instant invention are halogenated butyrolactone derivatives. It will be noted that the initial butyrolactone condensate with an aldehyde contains an alpha-exo double bond or unsaturation. In the method of the instant invention, this alpha-exo unsaturation is halogenated in accordance with the following equation:

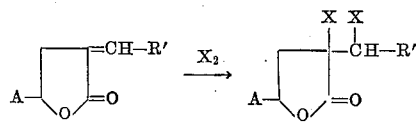

wherein R' is an organic radical and X is a halogen group.

Although very little was known heretofore about the butyrolactone condensation products which are used as the starting materials for the method of the instant invention, it would be expected that steric hindrance would prevent halogenation at the alpha-exo carbon-to-carbon double bond. We have found that this is not the case and, instead, halogenation takes place quite easily. Since mild halogenation conditions may be employed, we find that the radical R' may be any organic radical, or at least it may be any organic radical derived from the aldehyde: OCHR'.

The compounds of the invention include:

Alpha-(benzal)-butyrolactone dibromide:

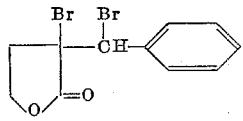

Alpha-(benzal)-butyrolactone dichloride:

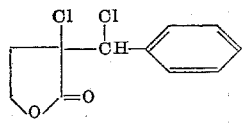

Alpha-(benzal)-butyrolactone diiodide:

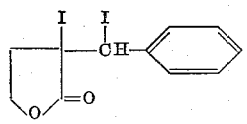

Alpha-(benzal)-gamma-valerolactone dibromide:

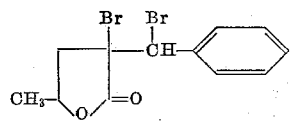

Alpha-(piperonal)-gamma-valerolactone dibromide:

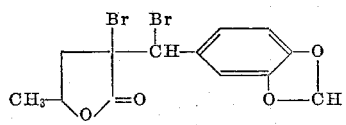

Alpha-(heptylidene)-gamma-valerolactone dibromide:

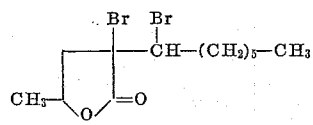

Alpha-(o-chlorobenzal)-butyrolactone dibromide:

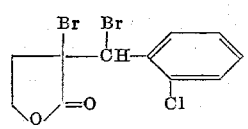

Alpha-(ethylidene)-butyrolactone dibromide:

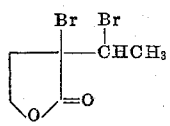

Alpha-(nonylidene)-butyrolactone dibromide:

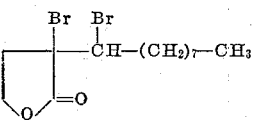

Alpha-$C_2$–$C_{18}$ alkylidene)-butyrolactone dibromide:

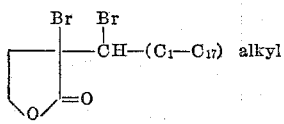

Alpha-(isovalerylidene)-butyrolactone dibromide:

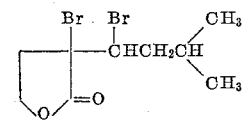

Alpha-(methoxyethylidene)-butyrolactone dibromide:

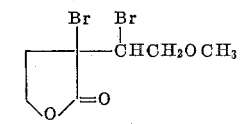

Alpha-(2-hydroxypropylidene)-butyrolactone dibromide:

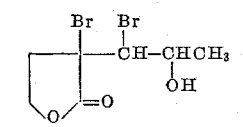

Alpha-(p-chlorobenzal)-butyrolactone dibromide:

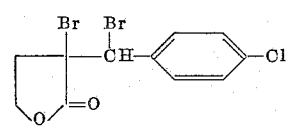

Alpha-(p-bromobenzal)-butyrolactone dibromide:

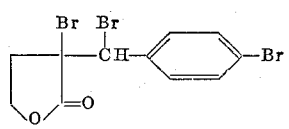

Alpha-(p-iodobenzal)-butyrolactone dibromide:

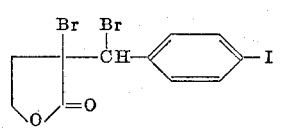

Alpha-(p-methylbenzal)-butyrolactone dibromide:

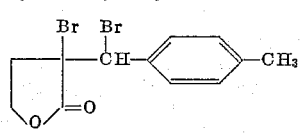

Alpha-($C_1$–$C_4$ alkylbenzal)-butyrolactone dibromide:

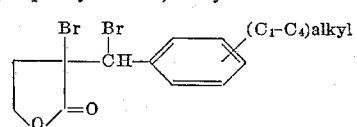

Alpha-(o-sulfhydrylbenzal)-butyrolactone dibromide:[1]

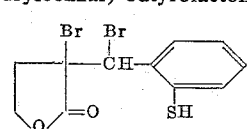

[1] This compound may also be referred to as "alpha-(o-mercapto-benzal)-butyrolactone dibromide."

Alpha-(o-methylmercaptobenzal) - butyrolactone dibromide:

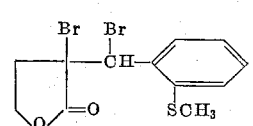

Alpha-(m-nitrobenzal)-butyrolactone dibromide:

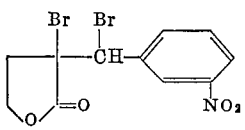

Alpha-(o-hydroxybenzal)-butyrolactone dibromide:

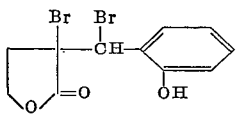

Alpha-(hydroxybenzal)-butyrolactone dibromide:

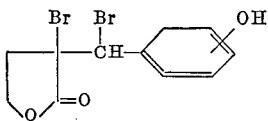

Alpha-(o-ethoxybenzal)-butyrolactone dibromide:

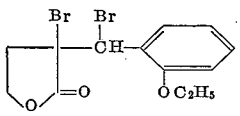

Alpha-(3,4-diethoxybenzal)-butyrolactone dibromide:

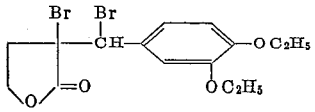

Alpha-(3,4,5-trimethoxybenzal)-butyrolactone dibromide:

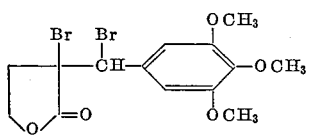

Alpha-(p-isopropylbenzal)-butyrolactone dibromide:

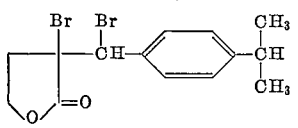

Alpha-(p-sec.-butoxybenzal)-butyrolactone dibromide:

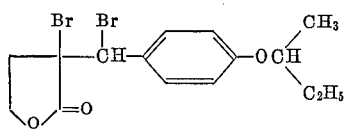

Alpha-(p-acetoxybenzal)-butyrolactone dibromide:

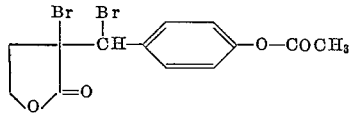

Alpha-(3-acetyl-4-hydroxybenzal) - butyrolactone dibromide:

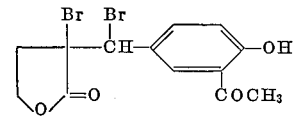

Alpha-(cinnamal)-butyrolactone tetrambromide:

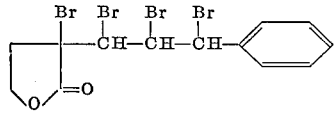

Alpha-(3,4,5-trimethoxybenzal) - butyrolactone dichloride:

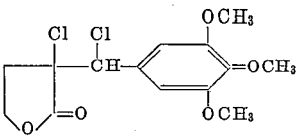

Alpha-(p-isopropylbenzal)-butyrolactone diiodide:

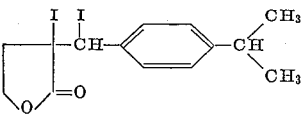

Alpha-(o-aminobenzal)-butyrolactone dibromide:

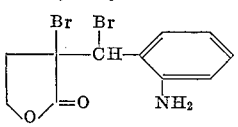

Some of the butyrolactone condensation products used as starting materials for the preparation of the instant dibromides are known. For example, the condensates of gamma-butyrolactone and gamma-valerolactone with benzaldehyde are known. Also, the condensates of gamma-valerolactone with piperonal and heptaldehyde are disclosed by Losanitsch. Said German Patent No. 844,292 discloses the butyrolactone condensates of o-chlorobenzaldehyde, furfural, acetaldehyde, and nonylaldehyde. The other condensates used as starting materials are prepared by carrying out the reaction of the German patent using the selected aldehyde.

In general, the condensation reaction is carried out by reacting 0.1 mol of the aldehyde with 0.2 mol of butyrolactone dissolved in 50–200 ml. of a solvent such as benzene. With stirring 0.15 mol of sodium methylate is added gradually and the stirring is continued for a short time thereafter under cooled reaction conditions. The initial reaction is carried out in an ice-salt bath and, in the case of liquid aldehydes being easily oxidized, the reaction is carried out under an atmosphere of dry nitrogen. Ordinarily, the reaction is completed by heating the reaction mixture briefly at 60–70° C. in a water bath. The reaction mixture is then decomposed with 10% aqueous sulfuric acid and stirring is continued for about 1 hour to effect relactonization. Ordinarily, the product precipitates and can be filtered off. In other instances, the sulfuric acid layer in the filtrate is separated, and the benzene layer is washed with dilute sodium bicarbonate solution, then water, and the benzene is then distilled off from this portion of the filtrate and the residue may be recrystallized for purification.

As a specific example, the apparatus used consists of a 500 ml. three-neck flask fitted with a stirrer, reflux condenser, thermometer and nitrogen inlet tube. A charge of 0.1 mol of salicylaldehyde and 0.2 mol of butyrolactone is dissolved in 100 ml. of benzene and, with stirring, cooled down to 3° C. by means of an ice-salt bath. A nitrogen atmosphere is maintained over the mixture. Over a period of 15 minutes, 0.25 mol of sodium methylate is added incrementally. The temperature rises to about 27° C. (a little over room temperature) and the mixture becomes a brownish jelly which is diluted with an additional 100 ml. of benzene. Stirring is then continued for 3 hours at this relatively low temperature, followed by heating in a water bath for 45 minutes at 60–65° C. After standing overnight, sufficient aqueous 10% sulfuric acid is added with stirring to make the reaction mixture acidic. Stirring is continued for an hour and the precipitate which is formed is filtered in a suction filter and washed thoroughly with water to yield alpha-(o-hydroxybenzal)-butyrolactone in the form of a white crystalline product which is further purified by three recrystallizations from methanol.

The procedure of the foregoing paragraph is used, except that the desired aldehyde is used in place of the salicylaldehyde, in order to produce the starting materials for each of the halogenated compounds listed hereinbefore.

Example 1

A charge of 0.03 mol of alpha-(benzal)-butyrolactone is dissolved in 60 ml. of acetic acid and 0.09 mol of bromine is added, at room temperature. After standing 24 hours at room temperature, the excess bromine and acetic acid are distilled off from the reaction mixture. A glassy residue is obtained which is dissolved in 10 ml. of hot methanol which, after cooling, yields a white crystalline precipitate melting at 96–98° C. A smaller fraction is obtained by concentrating the methanol, and this melts at 96–97° C. The total yield of alpha-(benzal)-butyrolactone dibromide is 93% and, after several additional recrystallizations from methanol the melting point is 100.5–101.5° C.

Example 2

A procedure is carried out that is the same as that of Example 1, except that the inert solvent used is carbon-tetrachloride (in place of the acetic aid) and the same results are obtained.

Example 3

A procedure is carried out that is the same as that of Example 2, except that the butyrolactone starting material is alpha-(p-hydroxybenzal)-butyrolactone, and the resulting product is alpha-(p-hydroxybenzal)-butyrolactone dibromide. The corresponding alpha-(o-hydroxybenzal)-butyrolactone and alpha-(m-hydroxybenzal)-butyrolactone dibromides are obtained using the same procedure, but employing the appropriate butyrolactone starting material.

Example 4

A procedure is carried out that is the same as that of Example 2, except that the halogenating agent used is chlorine and the resulting product is alpha-(benzal)-butyrolactone dichloride.

Example 5

A procedure is carried out that is the same as that of Example 2, except that the halogenating agent used is iodine and the resulting product is alpha-(benzal)-butyrolactone diiodide.

Example 6

A procedure is carried out that is the same as that of Example 1, except that the starting material used is alpha-(benzal)-gamma-valerolactone and the resulting product is alpha-(benzal)-gamma-valerolactone dibromide.

Example 7

The procedure of Example 2 is used to produce dibromides of butyrolactone and gamma-valerolactone with piperonal, heptaldehyde, chlorobenzaldehyde, acetaldehyde, nonaldehyde, isovaleraldehyde, methoxyacetaldehyde, lactic aid aldehyde, p-bromobenzaldehyde, p-iodobenzaldehyde, p-methylbenzaldehyde, o-sulfhydrylbenzaldehyde, o-methylmercaptobenzaldehyde, m-nitrobenzaldehyde, o-ethoxybenzaldehyde, 3,4-diethoxybenzaldehyde, 3,4,5-trimethoxybenzaldehyde, p-isopropylbenzaldehyde, p-acetoxybenzaldehyde, and 3-acetyl-4-hydroxybenzaldehyde. The tetrabromide of alpha-(cinnamal)-butyrolactone is obtained by using the same procedure, except that twice as much bromine is employed. The products obtained in each case are set forth in the list hereinbefore recited, showing the structural formulas for such products.

Example 8

The dichlorides corresponding to the dibromide products specified in previous Example 7, are obtained by carrying out the procedure of Example 4 using the starting materials specified in Example 7.

Example 9

The procedure of Example 5 is carried out using any of the butyrolactone condensates specified in Example 7 in order to obtain the corresponding diiodide.

Example 10

A charge of 0.3 mol of alpha-(benzal)-butyrolactone is dissolved in 180 ml. of concentrated sulfuric acid and the mixture is cooled by means of an ice-salt bath. With stirring, a solution of 0.33 mol of potassium nitrate in 140 ml. of concentrated sulfuric acid is added drop-wise over a period of an hour, during which time the internal temperature of the reaction mixture is held at 0° C. to 5° C. The reaction mixture is then kept for 3 more hours in the ice bath and finally poured onto ice. A slightly yellow precipitate results, which is filtered on a suction filter and thoroughly washed with water, until the washings are neutral, and then washed with cold methanol. This crude product is then treated briefly with 250 ml. of hot methanol and filtered hot; again washed with hot and cold methanol, and then with ether. This results in a yield of alpha-(o-nitrobenzal)-butyrolactone.

The methanol filtrates of alpha-(p-nitrobenzal)-butyrolactone described in the foregoing paragraph are concentrated to yield, upon one recrystallization from methanol, alpha-(o-nitrobenzal)-butyrolactone.

A procedure is carried out that is the same as that described in Example 2, except that the starting material used is alpha-(p-nitrobenzal)-butyrolactone and the resulting product is alpha-(p-nitrobenzal)-butyrolactone dibromide. The same procedure is used to obtain alpha-(o-nitrobenzal)-butyrolactone dibromide from the corresponding starting material. The dichloride of these two alpha-(nitrobenzal)-butyrolactones are obtained using the procedure of Example 4; and the diiodides are obtained using the procedure of Example 5.

Example 11

A charge of 0.0675 mol of alpha-(m-nitrobenzal)-butyrolactone is added to 0.4 mol of stannous chloride dissolved in 225 ml. of hydrochloric acid. Substantially the entire amount of the charge enters into solution, and after a few minutes moderately exothermic reaction occurs and the mixture solidifies. After 24 hours' standing at room temperature, the precipitate is filtered by suction and immediately added to 300 ml. of concentrated aqueous ammonia and stirred for several hours at room temperature. The residue is filtered again, washed thoroughly with water and dried over $P_2O_5$ at 5 mm. Hg. The resulting brown-yellowish powder is extracted with chloroform in a Soxhlet apparatus for 24 hours until the residue does not contain any more organic material. This is apparent from the color, since the exhausted inorganic powder is brownish-gray and does not show any yellowish zones. The chloroform extract is evaporated to dryness and the resulting yellow residue recrystallized from methanol to yield alpha-(m-aminobenzal)-butyrolactone. Using the procedure of Example 2, this compound is brominated to yield the product: alpha-(m-aminobenzal)-butyrolactone dibromide. Using this butyrolactone starting material in the procedure of Example 4, the product is alpha-(m-aminobenzal)-butyrolactone dichloride; and the procedure of Example 5 yields a corresponding diiodide.

Example 12

The corresponding dibromide, dichloride and diiodide of alpha-(p-aminobenzal)-butyrolactone are obtained by carrying out the procedures of Example 11, except that the starting material is alpha-(p-nitrobenzal)-butyrolactone. The corresponding dihalides of alpha-(o-aminobenzal)-butyrolactone are obtained following the same procedure using, as a starting material, alpha-(o-nitrobenzal)-butyrolactone.

Example 13

A charge of 2 mols of alpha-(m-aminobenzal)-butyrolactone is dissolved in ten times its weight of ethanol and 1 mol of acetyl chloride is added slowly to complete the reaction. The reaction mixture is then poured into an equal volume of water and cream colored crystals of alpha-(m-acetamidobenzal)-butyrolactone precipitate, are recovered by filtration and are purified by recrystallization to yield crystals having a melting point of 181.5–182° C. The alpha-(m-acetamidobenzal)-butyrolactone is halogenated by employing it as a starting material in the procedures of Examples 2, 4 and 5 to yield, respectively, the dibromide, dichloride and diiodide of alpha-(m-acetamidobenzal)-butyrolactone.

Example 14

A charge of 2 mols of alpha-(p-aminobenzal)-butyrolactone is dissolved in ten times its weight of ethanol and 1 mol of benzenesulfonyl chloride is added slowly to complete the reaction. The reaction mixture is then poured into an equal volume of water to obtain a precipitate of alpha - (p - benzene - sulfonamidobenzal) - butyrolactone. The corresponding dibromide, dichloride and diiodide of this compound are obtained by using this compound as the starting material in the procedures of Examples 2, 4 and 5, respectively.

Example 15

The aforementioned primary amino butyrolactone derivatives such as alpha-(p-aminobenzal)-butyrolactone are converted to secondary or tertiary amino derivatives by reaction with a suitable alkyl chloride, such as methyl chloride, ethyl chloride, propyl chloride, etc. For example, alpha-(p-ethyl-aminobenzal)-butyrolactone is prepared by refluxing a charge of 0.1 mol of alpha-(p-aminobenzal)-butyrolactone, 0.1 mol of ethyl chloride, 2 mols of methanol and 0.1 mol of trimethylamine for 2 hours and pouring of the resulting reaction mixture into an equal volume of water, from which the product precipitates and is separated. Using 0.2 mol of ethyl chloride and of the trimethylamine, the resulting product is alpha-(p-N,N-diethylaminobenzal)-butyrolactone. Using the procedures of Examples 2, 4 and 5, these secondary and tertiary amino compounds are converted, respectively, to the corresponding dibromides, dichlorides and diiodides.

Example 16

A charge of 0.0675 mol of alpha-(o-nitrobenzal)-butyrolactone (obtained in Example 10) is added to 0.4 mol of stannous chloride dissolved in 225 ml. of hydrochloric acid. Substantially the entire amount of the charge enters into solution, and after a few minutes moderately exothermic reaction occurs and the mixture solidifies. After 24 hours' standing at room temperature, the precipitate is filtered by suction and immediately added to 300 ml. of concentrated aqueous ammonia and stirred for several hours at room temperature. The residue is filtered again, washed thoroughly with water and dried over $P_2O_5$ at 5 mm. Hg. The resulting powder is extracted with chloroform in a Soxhlet apparatus for 24 hours until the residue does not contain any more organic material. The chloroform extract is evaporated to dryness and the resulting residue recrystallized from methanol to yield alpha-(o-aminobenzal)-butyrolactone. Using the procedure of Example 2, this compound is brominated to yield the product: alpha-(o-aminobenzal)-butyrolactone dibromide, which may also be referred to as alpha - (o - aminobenzyl) - alpha,alpha′dibromo-gamma-butyrolactone.

Example 17

As previously indicated in Example 7, alpha-(o-sulfhydrylbenzal) - butyrolactone or alpha - (o - mercaptobenzal)-butyrolactone may be prepared using the specific procedure described in column 6 hereof. For example, a charge of 0.1 mol of o-sulfhydrylbenzaldehyde and 0.2 mol of butyrolactone is dissolved in 100 ml. of benzene and, with stirring, cooled down to 3° C. by means of an ice-salt bath. The nitrogen atmosphere is maintained over the mixture. Over a period of 15 minutes, 0.25 mol of sodium methylate is added incrementally. The temperature rises to about 27° C. (a little over room temperature) and the mixture becomes a jelly which is diluted with an additional 100 ml. of benzene. Stirring is then continued for 3 hours at this relatively low temperature, followed by heating in a water bath for 45 minutes at 60–65° C. After standing overnight, sufficient aqueous 10% sulfuric acid is added with stirring to make the reaction mixture acidic. Stirring is continued for an hour and the precipitate which is formed is filtered in a suction filter and washed thoroughly with water to obtain alpha-(o-sulfhydrylbenzal) - butyrolactone in the form of a crystalline product which is further purified by three recrystallizations from methanol.

A procedure is carried out that is the same as that described in Example 1 herein, except that the aforementioned alpha - (o-sulfhydrylbenzal) - butyrolactone is substituted for the alpha-benzal-butyrolactone that was used in Example 1, and the resulting product is alpha-(o-sulfhydrylbenzal)-butyrolactone dibromide. Using, instead, the procedures of Example 4 and 5 with the instant starting material, the corresponding alpha-(o-sulfhydrylbenzal)-butyrolactone dichloride and diiodide are obtained.

It will thus be seen that, in the practice of the instant invention, the radical R′ may be any organic radical. The radical R′ may be a $C_1$–$C_{17}$ aliphatic radical. The radical R′ may be an aromatic radical wherein a benzene nucleus is attached directly to the C atom (in the derivative of the aldehyde OCHR), or the radical R′ may comprise a benzene nucleus which is attached to said C atom by a $C_1$–$C_3$ aliphatic chain, wherein any unsaturation is an olefinic unsaturation.

Preferably, R′ is an organic radical which contains only a single benzene nucleus and which does not contain any atoms other than C, H, O, N, halo, and S. Any O atom is preferably present in the radical R′ in an ether, hydroxy, carbonyl, carboxyly, nitro, or sulfonyl group. Any N atom present in the radical R′ is preferably in an amino, nitro or amido radical. Any S atom present in the radical R′ is preferably in a sulfhydryl, sulfonyl or thioether radical. Preferably, in the radical R′ at any one time there is not more than three O atoms, not more than two N atoms, and not more than one S atom.

DEHYDROHALOGENATION

A second step in the overall method concept of the instant invention involves dehydrohalogenation of certain of the compounds which are prepared in the halogenation procedure of the invention. The dehydrohalogenation involves essentially the removal of the alpha-halo radical and the removal of the alpha′hydrogen radical, and this results in the creation of an alpha-exo double bond or unsaturation, in accordance with the following equation:

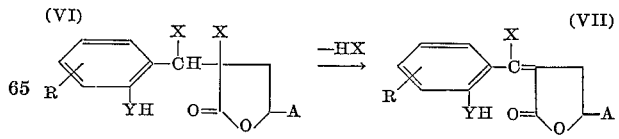

wherein Y is a O, S or NH group, R is a $C_1$–$C_4$ alkoxy or alkyl group, each X is a halogen group and A is H or $CH_3$. The foregoing reaction is carried out in the presence of an HX acceptor and/or merely by heating compound (VI) dissolved in a suitable inert solvent. Preferably the solvent used is acetic acid in an amount at least sufficient to completely dissolve compound (VI) and the system is refluxed to remove the HX. Actually the addition of a small amount of HX to this system seems to catalyze the dehydrohalogenation reaction.

The reaction may be carried out merely by refluxing a solution of compound (VI) in $C_1$–$C_4$ alkanol (e.g., methanol), or in $C_2$–$C_4$ alkanoic acid (e.g., glacial acetic acid). Also, there are additional advantages in the use of acetic acid in that it tends to protect the —YH radical, e.g., in the case of the —OH radical, it tends to block the same by formation of a —OCOCH$_3$ "blocked" group temporarily during the reaction, and this improves the ultimate yield.

It will thus be seen that the generic equation for the reaction sequence involved in this aspect of the instant invention, comprises an initial (1) halogenation reaction followed by the subsequent (2) dehydrohalogenation reaction, as indicated in the following equation:

(1) Halogenation:

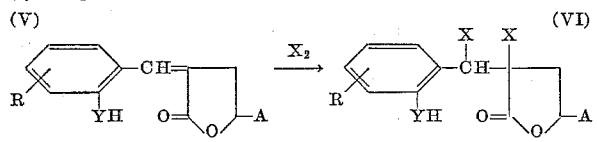

(2) Dehydrohalogenation:

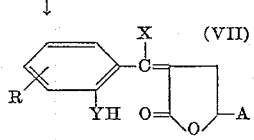

wherein the various letters and symbols have the significance already described. In a more specific aspect of the instant invention, comprising the specific reaction sequence using, as a starting material, alpha-(o-hydroxybenzal-butyrolactone, it will be seen that the reaction proceeds as follows:

(1) Bromination:

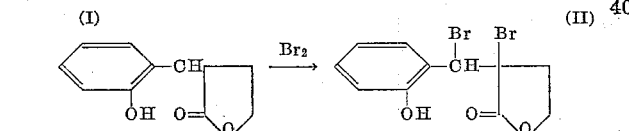

(2) Dehydrobromination:

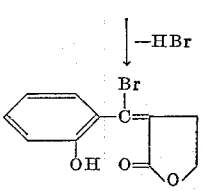

As previously indicated, the dehydrohalogenation or dehydrobromination step may be carried out merely by refluxing a solution of the compound (II) or (IV), whichever the case may be, in a suitable inert solvent, such as methanol. Preferably, however, this reaction sequence in connection with the dehydrohalogenation procedure is carried out employing solvents which are actually "inert" with respect to any reaction interfering with the ultimate dehydrohalogenation reaction, but which serve the additional purpose of blocking or protecting the —YH radical. This is particularly advantageous with respect to the —OH radical.

For example, the following reaction scheme may be used, wherein the reaction is indicated in each step by an equation followed by a procedure for carrying out the reaction indicated in the equation:

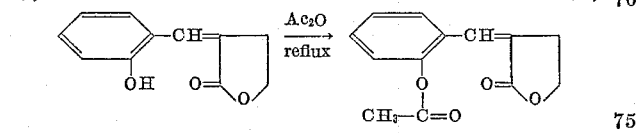

A charge of 25 grams of compound (I) is dissolved in 200 ml. of acetone (Ac$_2$O) and the reaction mixture is refluxed for 2 hours, and the acetone is then distilled off under vacuum to obtain compound (Ia) in a yield of 20.6 grams. Compound (Ia) has a melting point of 122–123° C. and its calculated analysis is C=67.23; H=5.21, with the actual computed analysis being found to be C=66.88% and H=5.34%. The subsequent bromination reaction proceeds as follows:

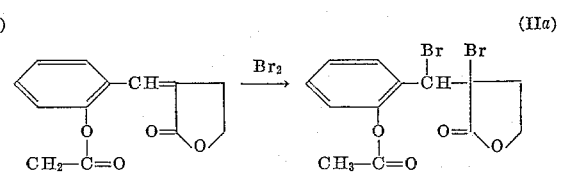

A charge of 16.6 grams of compound (Ia) is dissolved in 200 ml. of glacial acetic acid (AcOH) and to this 14.5 grams of Br$_2$ also dissolved in acetic acid is added over a period of 6 hours at a temperature of 30° C. This yields the crude intermediate product (IIa) which may be obtained in dehydrohalogenated form merely by permitting the reaction mass to stand overnight and then distilling off the acetic acid under vacuum and recrystallizing the residue from methanol to yield 15 grams of alpha-(o-hydroxybenzyl)- alpha-methoxy-alpha'-bromo-gamma-butyrolactone (IIIa), in accordance with the following equation:

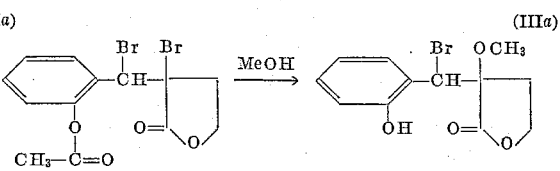

Next, 10 grams of compound (IIIa) are heated with 20 ml. of acetone at 180° C. in a pressure bottle for 2 hours; and the residue obtained after stripping off the acetone was in the form of crystals (melting at 156–157° C.) of alpha - (o-acetoxybenzyl) - alpha-methoxy-alpha'-bromo-gamma-butyrolactone (IIIb), according to the following:

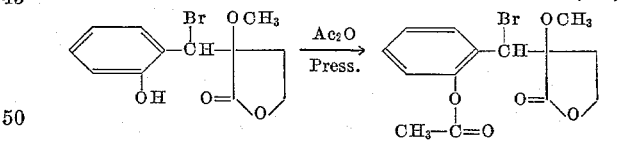

Compound (IIIb) may then be readily converted to compound (III) by refluxing a solution thereof in an inert solvent such as acetic acid, preferably in the presence of a small amount of HBr to catalyze the reaction. For example, a charge of 2 grams of compound (IIIb) is dissolved in 20 ml. of acetic acid, to which is added 6 drops of concentrated HBr, and the charge is refluxed for 4 hours. Upon cooling 0.8 gram of crystals are precipitated from ethanol, having a melting point of 216–217° C., in the form of alpha-(o-hydroxybenzylidene)-alpha'-bromo-gamma-butyrolactone (III), according to the following:

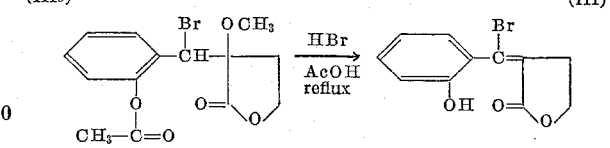

A procedure that is the same as that just described for the use of compound (I) as the starting material may also be employed by substituting for compound (I) the compound: alpha-(o-mercaptobenzal)-butyrolactone in order to obtain the resulting dehydrohalogenated compound: alpha-(o-mercaptobenzylidene) - alpha' - bromo-gamma-butyrolactone. In addition, the dihalides of alpha-(o-hydroxybenzal)-butyrolactone, alpha-(o-mercaptobenzal)-butyrolactone or alpha-(o-aminobenzal)-butyrolactone may be converted directly to the corresponding dehydrohalogenated compound (represented generally herein by the generic compound (VII)) merely by refluxing a solution of any of these dihalides (represented generically by the compound (VI)) in a suitable inert solvent, such as glacial acetic acid. For example, the corresponding dehydrohalogenated compound (VII) may be obtained merely by refluxing for approximately 20 hours a solution in 100 ml. of acetic acid of compound (III), alpha-(o-mercaptobenzal)-butyrolactone dibromide or alpha-(o-aminobenzal)-butyrolactone dibromide. Preferably this reaction is carried out, however, in the presence of several drops of concentrated HBr as the catalyst (even though HBr is actually split off during this reaction). It will also be appreciated that the corresponding reaction may be carried out using compounds of generic class (VII) wherein the radical R is a $C_1$–$C_4$ alkoxy or alkyl group substituted directly on the benzene nucleus.

It will thus be seen that the dehydrohalogenation products of the instant invention may be represented generically as having the following formula:

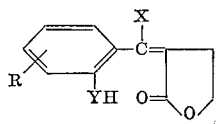

wherein R is selected from the group consisting of $C_1$–$C_4$ alkoxy and alkyl groups, A is selected from the group consisting of —H and —$CH_3$ groups, Y is selected from the group consisting of —O—, —S—, and —NH— groups, and X is a halogen group.

REARRANGEMENT

Still another aspect of the instant invention resides in a final rearrangement step, employing certain of the compounds previously described herein as starting materials. The resulting rearrangement compounds have been found to be particularly useful as anti-coagulants and precursors to antihistamines, and these compounds are understood to be safe for human use.

The manipulative steps of the rearrangement reaction are quite simple, involving merely the heating of the starting material for this reaction in the presence of a strong acid and/or the use of actinic light. The actual mechanics of the reaction are, however, rather involved. The generic reaction may be represented as follows:

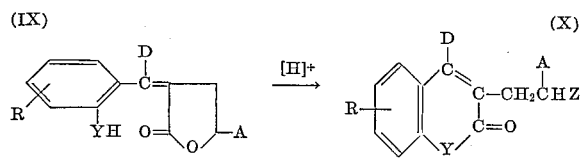

wherein D is either H or a halogen group, and the other letters of the alphabet and symbols have the same meaning as that already described herein.

Although it is not desired to limit the invention to any particular theory, it is believed that the rearrangement reaction from (III) to (IV), as indicated below, may involve a cleavage of the hydroxy H bond (a) with (1) creation of a bond (b) between the hydroxy O and the C atom connected to the exocyclic O and (2) cleavage of the bond (c) between said C atom and the intracyclic O. The free valence (d) of the formerly intracyclic O may then be satisfied by a free H (as indicated in the dotted line box and arrow):

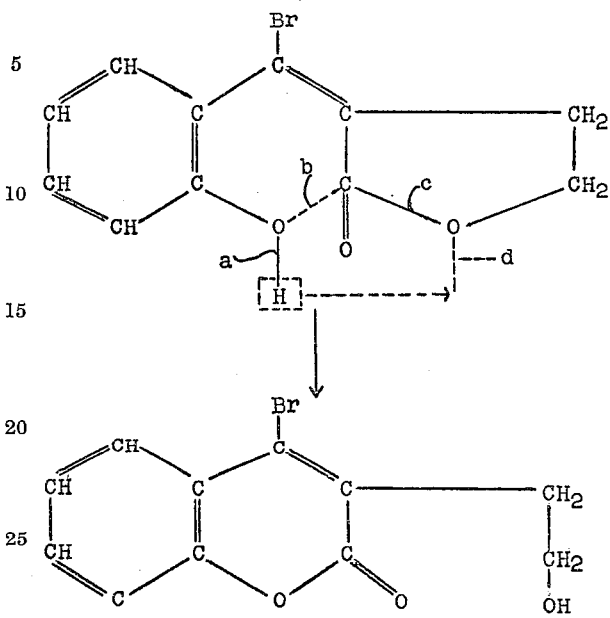

Compound (IV) is 3-(2-hydroxyethyl)-4-bromocoumarine.

The aforementioned compound (IV) is prepared by refluxing a solution of 250 mg. of compound (III) dissolved in 10 ml. of glacial acetic acid, in the presence of 1.5 ml. of 48% $H_2SO_4$ for approximately 18 hours, and the product (IV) crystallizes out upon cooling. If a strong acid such as sulfuric acid is used to catalyze this reaction, the resulting product which has been designated generically as compound (X) has an OH group at the position designated Z; but if the rearrangement reaction is catalyzed by HX, then the radical Z will be X.

For example, a charge of 250 mg. of compound (III) dissolved in 10 ml. of acetic acid, plus 1.5 ml. of 48% HBr is refluxed for 18 hours and upon cooling a product crystallizes out from ethanol having a melting point of 132–134° C. which is 3-(2-bromoethyl)-4-bromocoumarine, according to the following:

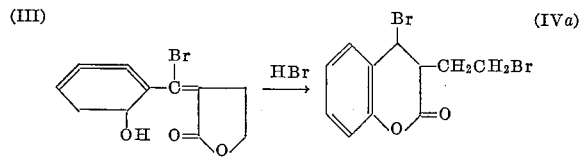

If the procedure that is the same that just described is repeated using, instead of compound (III) as the starting material, alpha-(o-mercaptobenzylidene)-alpha'-bromo-gamma-butyrolactone or alpha-(o-aminobenzylidene)-alpha'-bromo-gamma-butyrolactone, the corresponding rearrangement reaction is carried out and the resulting product is either 3-(2-bromoethyl)-4-bromothiocoumarine or carbostyril, depending upon whether or not the mercapto or amino starting material is used. Likewise, if compound (II), alpha-(o-mercaptobenzal)-butyrolactone dibromide or alpha-(o-aminobenzal)-butyrolactone dibromide are refluxed for 20 hours in acetic acid (using 14 grams per 100 ml. of acetic acid), HBr is split off during the process so as to carry out dehydrobromination, and 1 ml. of 10% $H_2SO_4$ is then added and the reaction mixture is refluxed for another 20 hours, then the resulting product is, respectively, compound (IV) (i.e., 3-(2-hydroxyethyl)-4-bromocoumarine), 3-(2-hydroxyethyl)-4-bromothiocoumarine, and 3-(2-hydroxyethyl)4-bromo-carbostyril. In each case the product may be crystallized out from ethanol.

It will also be appreciated that the reaction involving the rearrangement of compound (IX) to obtain compound (X) may be induced by actinic light. In this situation, the compound (IX) is dissolved in a suitable inert solvent such as acetic acid, to which is added a catalytic amount of a strong acid such as a hydrogen halide or sulfuric acid in order to make the system strongly acid (or in other terms to present a strong hydrogen ion concentration in the system), and the system is then subjected to actinic light to obtain the rearrangement compound (X). It will also be appreciated that the generic rearrangement reaction involves the use of a starting material (IX) which is not limited specifically to the dehydrohalogenation products previously designated by the generic formula (VII). Instead, the halogen group X in the generic formula of (VII) may be replaced by hydrogen to form a starting material within the scope of the generic formula (IX) for use in the rearrangement process. In other words, a charge of 10 grams of alpha-(o-hydroxybenzal)-butyrolactone, alpha-(o-mercaptobenzal)-butyrolactone, or alpha-(o-aminobenzal)-butyrolactone, may be dissolved in 200 ml. of acetic acid, containing 15 ml. of concentrated $H_2SO_4$, and this charge may be either refluxed or subjected to actinic light for a period of about 20 hours, in order to obtain, respectively, 3-(2-hydroxyethyl)-coumarine, 3-(2-hydroxyethyl)-thiocoumarine, and 3-(2-hydroxyethyl)-carbostyril. Likewise, each of the foregoing starting materials in the same procedure may be replaced by alpha-(o-hydroxybenzylidene)-alpha'-bromo-gamma-butyrolactone, alpha-(o-mercaptobenzylidene)-alpha'-bromo-gamma-butyrolactone, and alpha-(o-aminobenzylidene)-alpha'-bromo-gamma-butyrolactone in the same procedure so as to obtain, respectively, 3-(2-hydroxyethyl)-4-bromocoumarine, 3-(2-hydroxyethyl)-4-bromothiocoumarine, and 3-(2-hydroxyethyl)-4-bromocarbostyril.

As another example, a charge of 10 grams of compound (I), i.e., alpha-(o-hydroxybenzal)-butyrolactone, is refluxed for 18 hours in 100 ml. of acetic acid in the presence of 15 ml. of 48% HBr and, upon cooling, a yield of 9.1 grams crystallized out in the form of 3-(2-bromoethyl)-coumarine. The same procedure is repeated using as a starting material in place of compound (I) alpha-(o-mercaptobenzal)-butyrolactone and the resulting product is 3-(2-bromoethyl)-thiocoumarine. The procedure is again repeated using as a starting material alpha-(o-aminobenzal)-butyrolactone and the resulting product is 3-(2-bromoethyl)-carbostyril.

As another example of the rearrangement reaction, in this case when it is light catalyzed, a charge of 200 ml. of alpha-(o-aminobenzal)-butyrolactone is dissolved in 1000 ml. of ethanol and the charge is radiated with a tungsten bulb for several days (until the orginal solution turns colorless). The ethanol is then stripped off to obtain a colorless residue having a melting point of about 140–170° C. This residue is dissolved in the minimum amount of hot ethanol, and cooled down whereupon recrystallization occurs to yield 60 milligrams of crystals which have a melting point of 195–196° C. This is 3-(2-hydroxyethyl)-carbostyril. Analysis: calculated C=69.82%, H=5.86%, N=7.40%; found: C=69.85%, H=6.14%, N=7.50%. It is also found that mother liquor yielded upon dilution with water a second crop of crystals having a melting point of 120–130° C., this material was found to be substantially identical with authentic 2,3-dihydrofuranoquinolin.

In still another procedure, 4 grams of alpha-(o-aminobenzal)-butyrolactone in 50 ml. of acetic acid were refluxed in the presence of 5 ml. of 48% HBr for 16 hours. The resulting solution so obtained is cooled and diluted with 250 ml. of water whereupon crystals of 3-(2-bromoethyl)-carbostyril having a melting point of 176° C. were obtained in 4.05 grams yield. Analysis: calculated C=52.40, H=3.99, N=5.55, Br=31.69; found: C=52.27, H=3.89, N=5.57, Br=31.31%.

It will thus be seen that the overall process leading up to the ultimate rearrangement product (X) may start with the generic compound (V) and go through the halogenation and dehydrohalogenation steps, or starting with the same compound (V) it may go directly to the rearrangement product (X) (as indicated by the dashed line in the following equation representing the overall sequence):

(1) Halogenation:

(2) Dehydrohalogenation:

(3) Rearrangement:

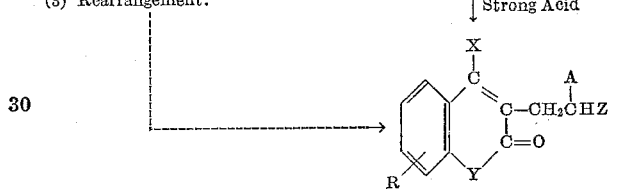

wherein Y is a O, S or NH group, R is a $C_1$–$C_4$ alkoxy or alkyl group, each X is a halogen group, A is H or $CH_3$, and Z is an OH or a halogen group.

We claim as our invention:

1. A compound selected from the group consisting of 3-(2-hydroxyethyl)-carbostyril, 3-(2-hydroxyethyl)-4-bromocoumarine, 3-(2-hydroxyethyl)-4-bromothiocoumarine, 3-(2-hydroxyethyl)-4-bromocarbostyril, and 3-(2-bromoethyl)-carbostyril.

2. A compound having the following formula:

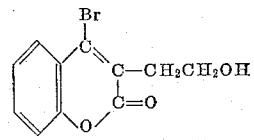

3. A compound having the following formula:

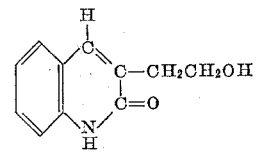

4. A compound having the following formula:

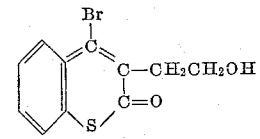

References Cited by the Examiner

UNITED STATES PATENTS

| | | | |
|---|---|---|---|
| 2,858,315 | 10/1958 | Matter et al. | 206—289 |
| 2,995,557 | 8/1961 | Brossi | 260—289 |
| 3,007,940 | 11/1961 | Shavel et al. | 260—343.6 |
| 3,008,969 | 11/1961 | Pretka | 260—343.2 |
| 3,009,922 | 11/1961 | Klein et al. | 260—343.6 |

(Other references on following page)

FOREIGN PATENTS 805,748  12/1958  Great Britain.

OTHER REFERENCES

Burger: Medicinal Chemistry, 2nd ed. Academic Press, 1960, p. 43.

Elderfield: Heterocyclic Chemistry, vol. 2, Wiley, 1952, p. 198.

Fieser et al.: Advanced Organic Chemistry, Reinhold, 1960, p. 629.

Kuwayana I Yakagaku Zasshi: vol. 80, pp. 913–16 (1960), (abstracted in Chem. Abstracts, vol. 54, col. 24690).

Kuwayana II Yakagaku Zasshi: vol. 80, pp. 1487–8 (1960), (abstracted in Chem. Abstracts, vol. 55, col. 5482), Lele et al., J. Org. Chem., vol. 25, pp. 1713–16.

Kuwayana III Yakagaku Zasshi: vol. 81, pp. 1278–1281 (1961).

Lele et al.: Org. Chem., vol. 25, pp. 1713–16 (1960), (abstracted in Chem. Abstracts, vol. 55, cols. 2628–9).

Ohta et al.: Chem. Abstracts, vol. 52, cols. 3814–5 (1958).

Raman: Chem. Abstracts, vol. 52, cols. 18381–2 (1958).

Sato et al.: Chem. Abstracts, vol. 52, col. 7336 (1958).

ALEX MAZEL, *Primary Examiner.*

DUVAL T. McCUTCHEN, HENRY R. JILES,
*Examiners.*

D. M. KERR, D. G. DAUS, *Assistant Examiners.*